United States Patent
O'Brien et al.

(10) Patent No.: US 10,333,813 B1
(45) Date of Patent: Jun. 25, 2019

(54) TIME-OUT TRACKING FOR HIGH-THROUGHPUT PACKET TRANSMISSION

(71) Applicant: Amazon Technologies, Inc., Seattle, WA (US)

(72) Inventors: Kari Ann O'Brien, Austin, TX (US); Thomas A. Volpe, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 347 days.

(21) Appl. No.: 14/750,590

(22) Filed: Jun. 25, 2015

(51) Int. Cl.
*H04L 12/26* (2006.01)

(52) U.S. Cl.
CPC .......... *H04L 43/0888* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 6,687,859 B2* | 2/2004 | Robsman | G06F 9/52 709/227 |
| 8,131,840 B1* | 3/2012 | Denker | H04L 67/2819 370/252 |

* cited by examiner

*Primary Examiner* — Azizul Choudhury
(74) *Attorney, Agent, or Firm* — Klarquist Sparkman, LLP

(57) ABSTRACT

A timer scheduler is used to track timeout values for network connections. A single hardware timer generates timeout values that can be tracked per connection in a linked list that is processed at set time intervals. All tracked connections can have a future timeout scheduled. Future timeout values can be stored in both a linked list and a connection state table that cross-reference each other. The linked list is traversed at predetermined intervals to determine which entries have timed out. For each entry that timed out, a second check is made against a timeout value in the connection state table. If timeout value within the connection state table indicates that a timeout occurred, then the network connection is terminated.

22 Claims, 9 Drawing Sheets

TIME-OUT TRACKING FOR HIGH-THROUGHPUT PACKET TRANSMISSION

BACKGROUND

Software packages are available to manage network connections, such as offering options for packet filtering, network address translation, and port translation. Such functions direct packets through a network and provide an ability to prohibit packets from being delivered to unauthorized locations.

Such software packages can also provide packet (network connection) tracking ability. For example, packet (network connection) state information can be tracked in order to analyze if a next received packet complies with the state of a network connection. If not, the packet can be dropped. Otherwise, the packet can be forwarded. Packet tracking can also include having timers that timeout if a packet has not been received for more than a predetermined period of time. With potentially millions of connections being tracked, monitoring a large number of timers can be difficult and requires extensive system resources, which can result in slowing packet throughput. An example of such a software package is Netfilter.

DETAILED DESCRIPTION

Figure 1:
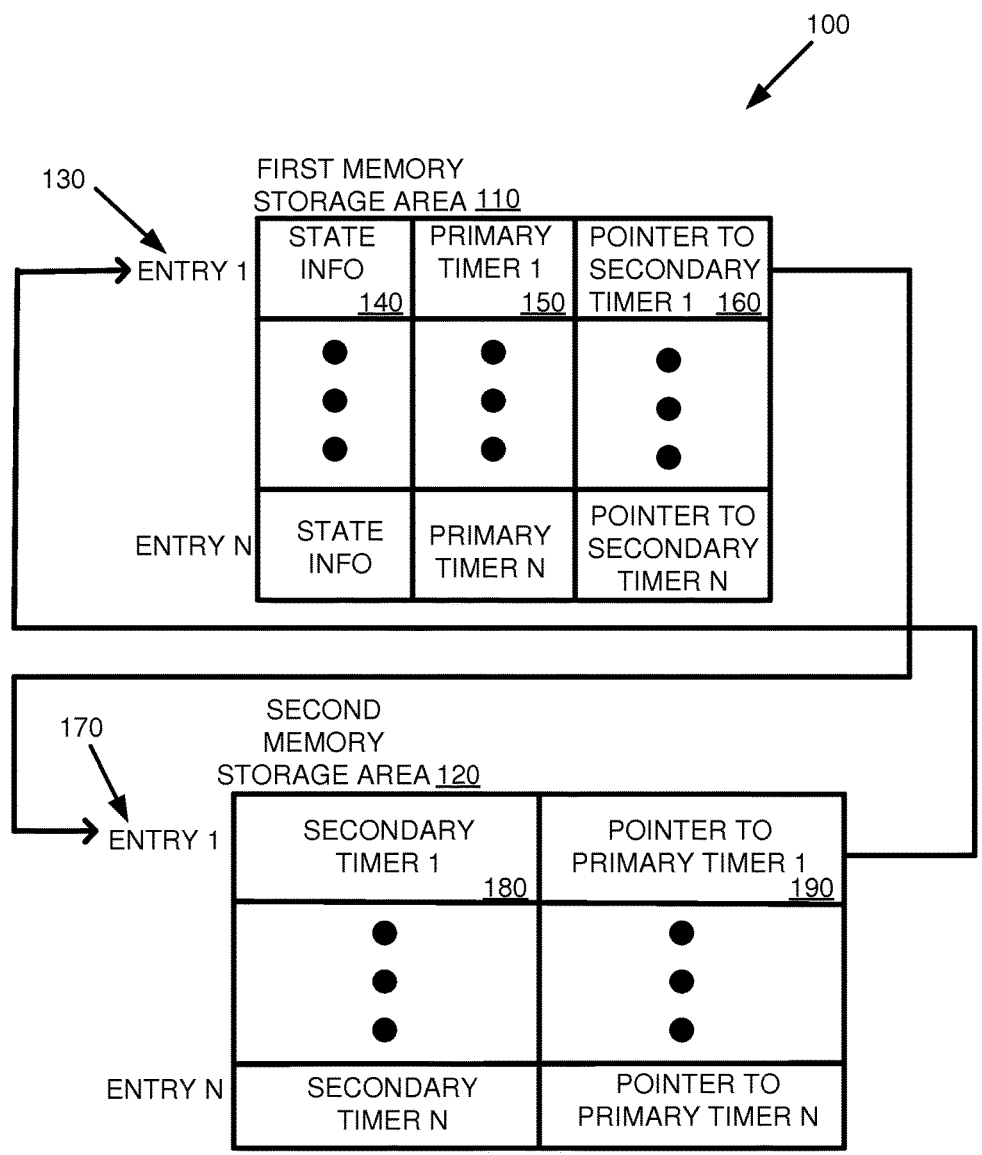
FIG. 1 shows a memory structure for tracking timeout values in packet transmissions including two different memory storage areas that cross-reference each other.

In different network-based environments, a service provider can receive millions of packets each second on millions of different network connections. Each connection can be tracked to ensure that a packet is received within a predetermined period of time. If a packet is not received, the connection can be terminated. It is not practical to have a separate hardware timer for every packet or every connection. Therefore, in the embodiments described herein, a timer scheduler is used in conjunction with a single hardware timer to generate timeout values that can be tracked per connection in a linked list that is processed at set time intervals. All tracked connections can have a future timeout scheduled. When a valid packet arrives for a new connection, a linked list entry is selected from a pool of entries kept in an availability FIFO. A future timeout value can be calculated based on a protocol type and packet state for that connection. That future timeout value can be placed in both a linked list and in a connection state table. When a valid packet arrives for an existing connection, the timeout value can be updated in an entry of the connection state table. However, the linked list is not updated upon receiving a packet so as to reduce how often the linked list is accessed. Whenever the timer in hardware indicates that a predetermined period of time has passed, a controller traverses the linked list to check every timeout value against a current time. If a timer has expired, the corresponding connection state entry is fetched. If the value in the connection state entry is larger than the current time, then it is determined that the timeout has not expired. The timeout can then be updated for that connection in the linked list. On the other hand, if the timeout value in the connection state table has also expired, then the network connection is considered to have expired and the network connection is deleted from the connection state table and the linked list.

The hardware structure described herein can also be used for state tracking of logical network connections. For example, state can be tracked for each individual connection between two devices on a network, such as a server computer and a client computer. State tracking allows filtering of malicious spoofed packets that are correctly constructed, but not legal in a sequence of packets already in progress on that connection. In a particular implementation, the system can track ingress and egress packet headers and their associated state on a per-connection basis. Typically, a main memory is used to support state tracking operations by storing one entry per connection. The entries can be modified every time a valid packet is processed by the system. The connections (i.e., sessions) can be identified using header information, such as a source address, a destination address, a source port, a destination port, and a protocol type (e.g., TCP).

Various embodiments of the disclosed technologies can be implemented using different types of hardware. In some cases, the hardware comprises an I/O adapter device, which may be any device that inputs and/or outputs data along a communication channel. In one aspect, the I/O adapter device can facilitate communication between various physical and/or emulated components. The I/O adapter device can include embedded microprocessors to allow the device to execute software instructions. The I/O adapter device can also comprise other types of hardware logic. In some embodiments, the I/O adapter device is attached to, or integrated into, a host device, such as a server computer. Possible examples of I/O devices can include network interface cards (NICs), offload engines, or other devices.

FIG. 1 shows a first embodiment of a structure 100 for tracking timeout values in packet transmissions. The structure 100 can include at least two separate memory storage areas, shown as a first memory storage area 110 and a second memory storage area 120. The memory storage areas 110, 120 can be located in physically separate memory chips or within a single memory chip, but with different areas allocated for each table. The first memory storage area 110 includes a plurality of entries shown at 130, with one entry per network connection in the system. The first memory storage area 110 is shown as having N different entries (where N can be any integer value). Each entry includes a plurality of fields, such as a state information field 140, a primary timer field 150, and a pointer to a secondary timer 160. The state information 140 provides a current state of the network connection associated with the entry based on previously received packets and possibly other information, such as a type of protocol being used. The primary timer field 150 is one of multiple timers used to determine whether the network connection is still valid or whether the network connection has timed out due to lack of receiving a packet within a predetermined period of time. A third field 160 is a pointer to an entry in the second memory area 120.

The second memory storage area 120 also includes a plurality of entries shown generically at 170, wherein the number of entries is typically identical to the number of entries 130 for the first memory storage area 110. In other embodiments, additional entries can be used. The second memory storage area 120 includes numerous fields for each entry including a secondary timer 180 and a pointer to the entry including the primary timer 190. Thus, as can be seen, each entry within the first memory storage area 110 and the second memory storage area 120 cross reference each other in order to accurately track timeout values, as is further described below. It should be noted that each entry in the first memory storage area 110 has a corresponding entry for the same network connection in the second memory storage area 120 and vice versa.

Figure 2:
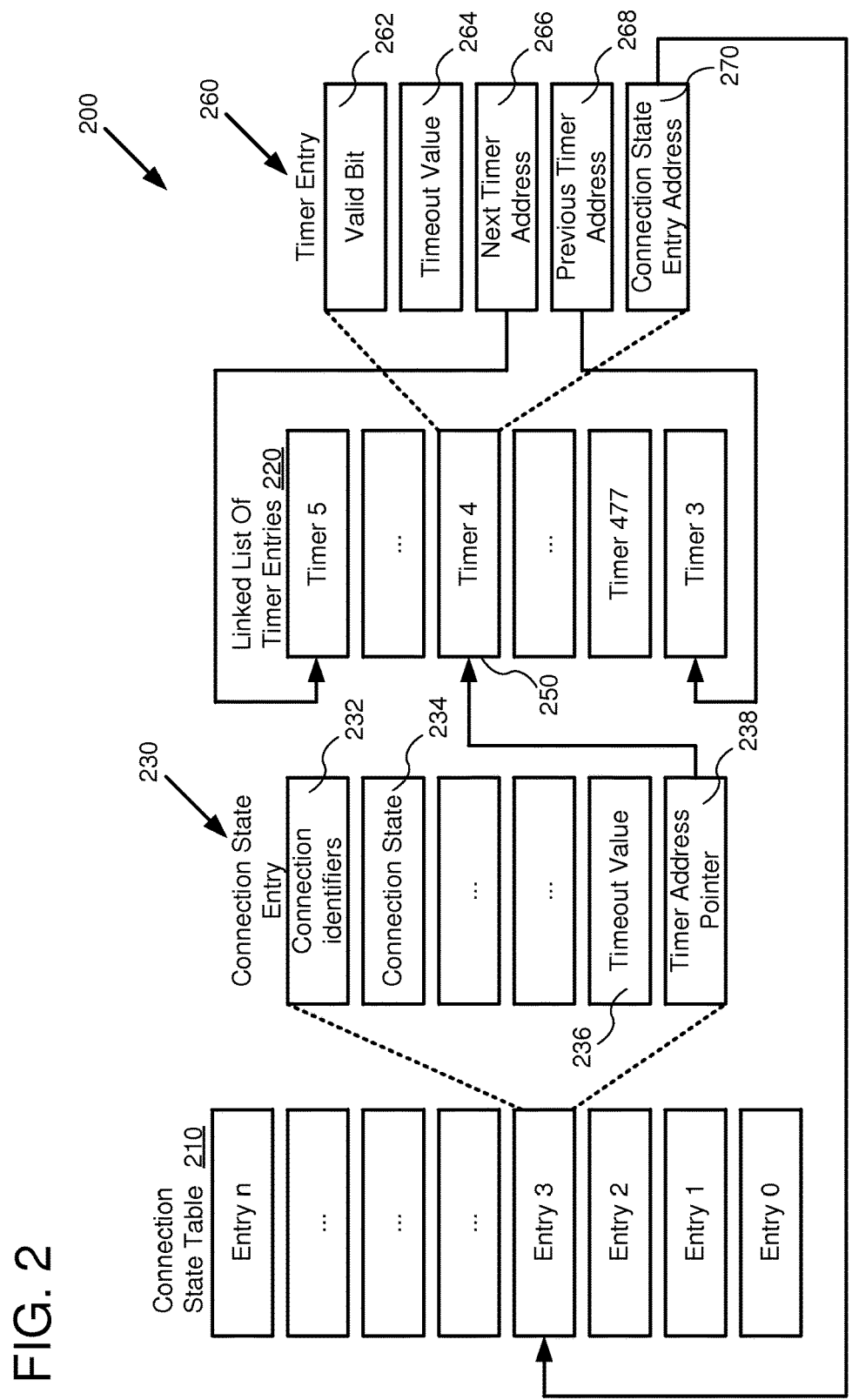
FIG. 2 shows particular embodiment with further details of the memory structure of FIG. 1.

FIG. 2 shows a particular implementation for tracking timeout values in packet transmissions. The structure 200 includes a connection state table 210, acting as a first memory storage area, and a linked list of timer entries 220, acting as a second memory storage area. The connection state table 210 includes N connections (where N is any integer number) and each connection is shown as a separate entry. Details of a particular entry are shown at 230 as including multiple fields. A first field 232 includes a connection identifier, which can identify the network connection using different fields in a packet header, such as a source address, a destination address, a source port, a destination port, and a protocol type (e.g., TCP). Other fields can be used to identify the network connection, as is well understood in the art. Field 234 includes state information associated with the network connection and is based on the last received packet and the type of protocol. The entry 230 also includes a timeout value 236. The timeout value can be considered a primary timeout value as it is the value that is ultimately examined to determine whether a timeout of the network connection occurred. The entry 230 can also include a timer address pointer 238 that points to a corresponding entry within the linked list of timer entries 220. In this particular example, the timer address pointer 238 points to an entry 250 within the linked list of timer entries. Unlike the connection state table 210, which is an ordered list of entries 0 through N, the linked list 220 has a random ordering of the different network connections. As such, the timer address pointer 238 allows for easy and fast identification of the corresponding network connection entry within the linked list of timer entries 220. In this particular example, the timer 4, shown at 250, includes multiple fields, as indicated at 260. A first field 262 is a valid bit, which indicates whether the timer entry is valid or not. Stated another way, the valid bit indicates whether the entry within the linked list of timer entries 220 is available or not for use. In another field, a timeout value 264 can be stored. The timeout value 264 is sometimes the same as timeout value 236 in the connection state table 210. However, other times the timeout value 264 is out-of-date and, thus, is subordinate to the timeout value 236. For this reason, the timeout value 264 within the linked list of timer entries is called a secondary timeout value. A field 266 of the timer entry 260 is a next timer address that indicates the next entry in the linked list. A field 268 indicates a previous timer address in the linked list of time entries 220. Thus, the fields 266 and 268 form a doubly linked list which allows entries to easily be removed. As is well understood in the art, the previous timer address field 268 can be removed (resulting in a singly linked list) and other techniques can be used for removing entries from the linked list 220. At 270, the timer entry 260 is shown as having a connection state entry address 270. This address points to the address for the same network connection as timer 250, but for a corresponding entry in the connection state table 210. Thus, the two structures 210, 220 cross reference each other so that for any network connection it is easy to determine the corresponding entry in the other memory area. Although particular fields are shown with respect to the connection state table and the linked list of timer entries, any of these fields can be removed or other fields added. Nonetheless, as further described below, it is the cross referencing between the connection state table 210 and the linked list of timer entries 220 that assists in saving packet throughput and analysis.

Figure 3:
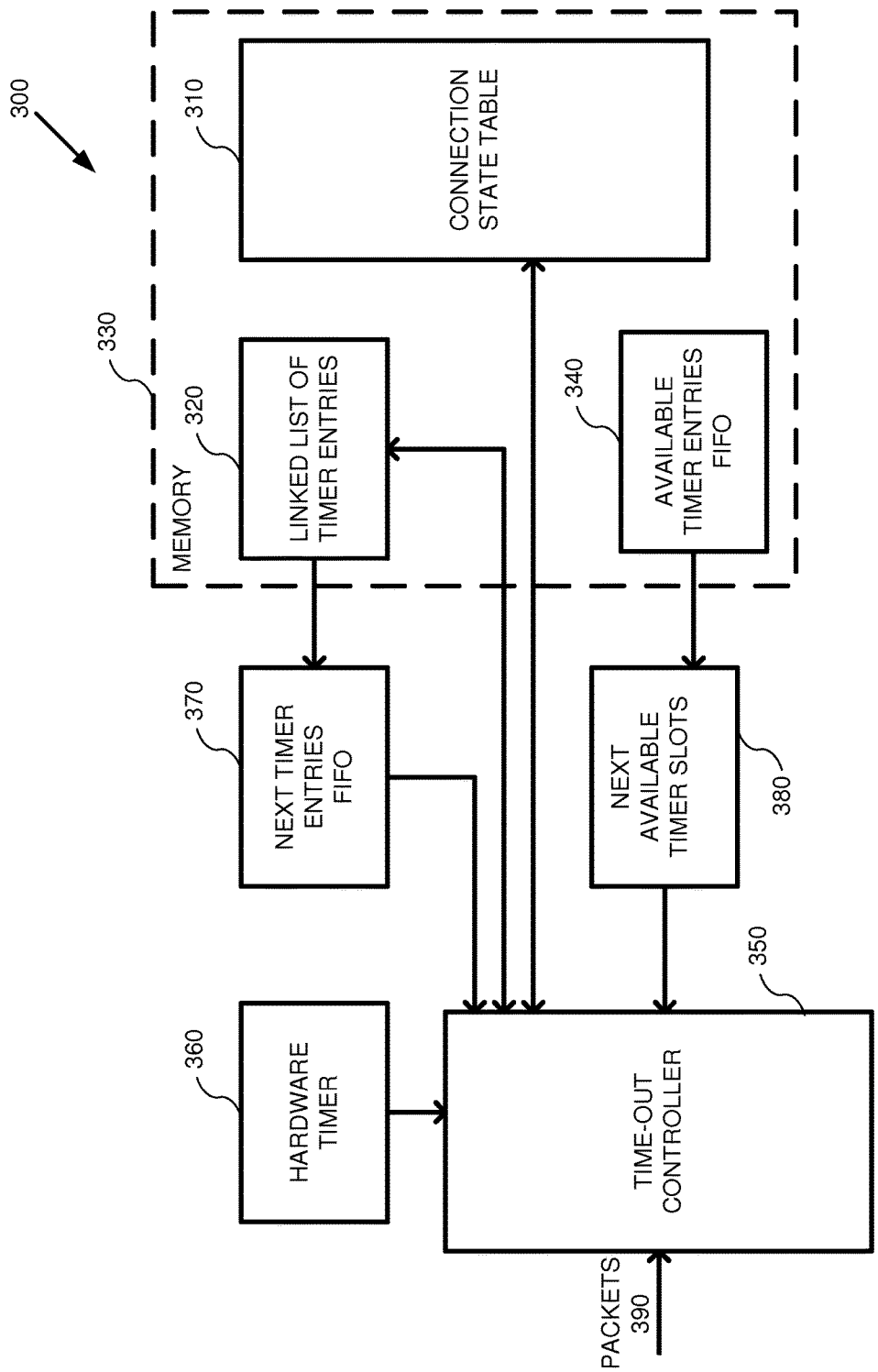
FIG. 3 shows an embodiment of an overall system diagram including the memory structure of FIG. 1.

FIG. 3 shows a system diagram 300 according to one embodiment that can be used for tracking timeout values in packet transmissions. The system 300 can include a connection state table 310, a linked list of timer entries 320, and an available timer entries First-in-First-Out (FIFO) storage 340, all of which are stored in different memory storage areas in a memory 330. Although the different storage areas are shown as different areas in the memory 330, they can be divided into separate memory chips altogether. The connection state table 310 can include a plurality of entries for each network connection being tracked, such as was shown in FIG. 2 at 210. Similarly, the linked list of timer entries 320 can include a list of corresponding entries with timer information for each of the network connections being tracked. The nature of a linked list is such that available entries (unused) can be intermingled amongst currently used entries. As such, the available timer entries FIFO 340 stores a list of entries that are available for use in the linked list 320. A time-out controller 350 implements the flow diagrams described herein so as to track timeout values for packet transmissions. The time-out controller can be any of a variety of processor-type devices including microcontrollers, microprocessors, FPGAs, ASIC logic, or any other hardware logic. Any suitable controller can be used for acting as a timer scheduler. The time-out controller can also have access to a real-time clock so as to track time/day/month/year, if desired. The time-out controller 350 is coupled to a single hardware timer 360 that supplies a periodic signal used to initiate traversing the linked list, as further described below. The single hardware timer also maintains a current time (i.e., the real-time clock) so as to generate future timeout values and for comparing against other timeout values. The hardware timer 360 can be external to the time-out controller 350 or integrated therein. For example, a clock can be supplied to the time-out controller 350 and the hardware timer can generate a periodic signal based on how many clock cycles have passed. There are numerous designs for triggering a timing event and any such designs can be used. In any event, at predetermined intervals the time-out controller traverses the linked list 320 so as to determine which timers have expired. The frequency of the periodic interval is configurable. Consequently, a single hardware timer can be used to control primary and secondary timeout values for all network connections. Separate hardware 370 is shown so as to load the next timer entries to be analyzed from the linked list. The hardware 370 can include a FIFO or other storage structure so as to prefetch the next entries to analyze by the time-out controller 350. If desired, the hardware 370 can be eliminated and the linked list of timer entries 320 can be coupled directly to the time-out controller 350. Similarly, the available timer slots can be prefetched in hardware 380, which can also include a FIFO storage. The prefetching hardware 370 and 380 is used to speed up accessing of the memory 330 by the time-out controller 350. The time-out controller 350 receives new packets as indicated at 390 and determines whether the packets are for new connections or existing connections. In either case, the time-out controller 350 stores state information associated with the packets in the connection state table 310.

Generally, the size of the connection state table 310 is sufficient for all possible network connections, whether those connections are active or not. In a typical application, the connection state table can be large enough to support millions of simultaneous network connections. However, at any one time, there can be far less connections actually being used. As a result, the connection state table 310 can be sparsely populated. At the same time, the linked list 320 typically is densely populated with active network connections. As a result, traversing the connection state table 310 to determine timeout values is time consuming, while traversing the linked list is much faster.

Using the hardware of FIG. 3, the accuracy of the hardware timer 360 can be low (e.g., ½ second accuracy), as the linked list only needs to be traversed a few times each second. Meanwhile, the connection state table is typically accessed and updated on the order of every 20 ns.

Figure 4:
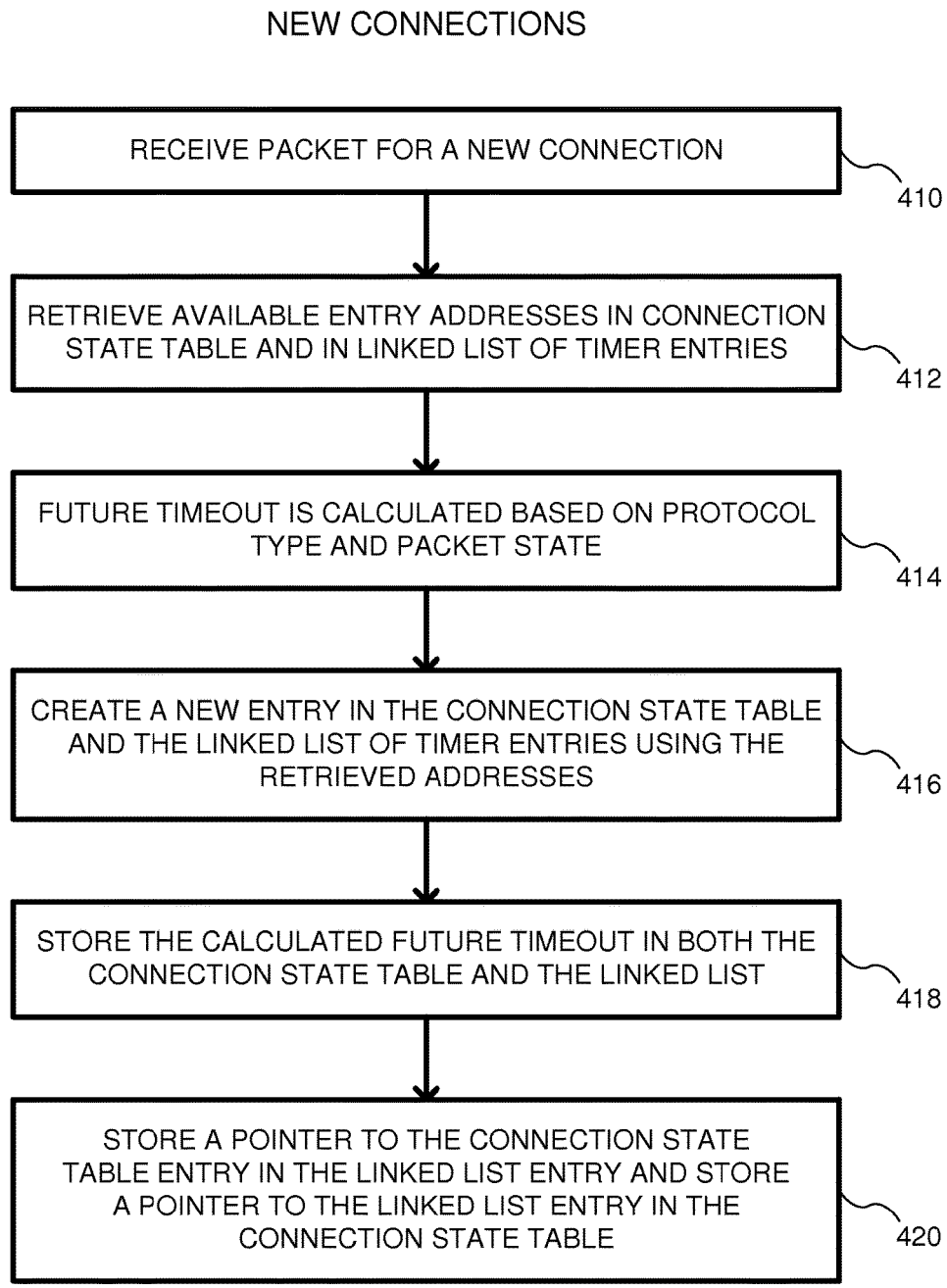
FIG. 4 is a flowchart according to one embodiment for using the structures of FIG. 1 when new network connections are established.

The system as described herein can be an input/output (IO) device, such as a network interface card or an offload engine. FIG. 4 shows a flow chart of a method used by the time-out controller 350 when it receives a packet for a new connection. In process block 410, a packet is received for the new connection. The time-out controller can use the packet information, such as in the header, to generate a unique identifier for the connection. That unique identifier can then be used to search within the connection state table 310 to determine whether an existing entry is open for that connection or whether it is a new connection. In one embodiment, the unique identifier can be used to generate a hash value that can be used to search the connection state table. Other look-up techniques can be used. For a new connection, the time-out controller 350 determines a new location within the connection state table to store an entry for the new connection. In particular, in process block 412, available entry addresses in connection with the connection state table 310 and the linked list of timer entries 320 are retrieved. For example, the available timer slots can be supplied by the hardware 380. Available entries in the connection state table 310 can also be supplied through hardware, such as a FIFO, that is not shown. In process block 414, the time-out controller 350 can calculate a future timeout for the packet based on the protocol type and the packet state. The duration of the timeout can vary tremendously. Example values can range from seconds to days in duration. In process block 416, a new entry is created in the connection state table and the linked list of timer entries using the retrieved addresses. In process block 418, the calculated future timeout value is stored in both a connection state table and in the linked list. In process block 420, a pointer to the connection state table entry is stored in the linked list entry and a pointer to the linked list entry is stored in the connection state table. Thus, the linked list of timer entries 320 and the connection state table 310 cross-reference each other so that corresponding entries can be easily found for a network connection.

Figure 5:
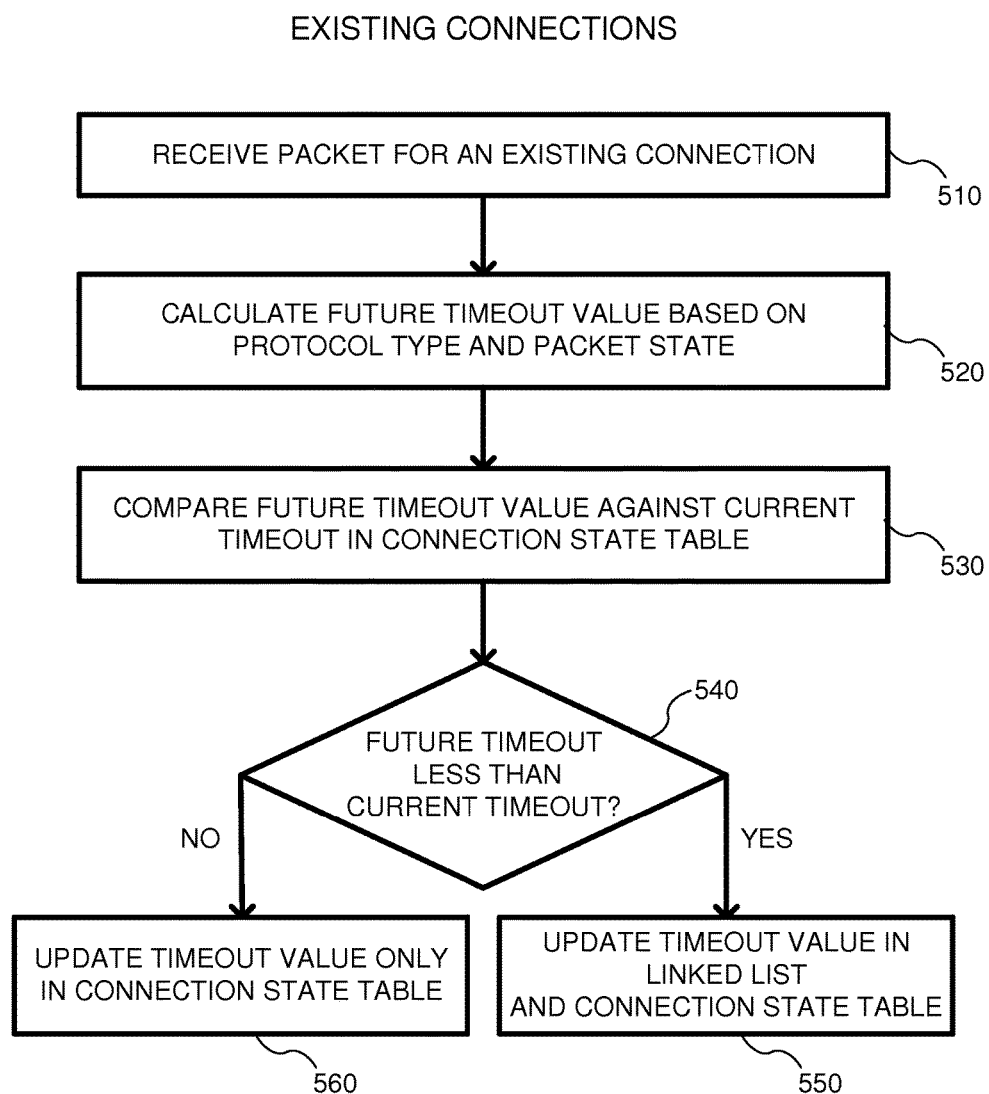
FIG. 5 shows a flowchart according to another embodiment for using the structures of FIG. 1 when a packet is received for an existing network connection that causes the network connection state to change.

FIG. 5 is a flow chart of an embodiment that can be used by the time-out controller for tracking timeout values and packet transmissions for existing connections. In process block 510, a packet is received on an existing connection. For example, returning to FIG. 3, the time-out controller 350 can receive a packet 390 and analyze the header of that packet in order to generate a unique ID for the network connection. The time-out controller 350 can then search in the connection state table 310 to determine whether an entry exists for that network connection. For new connections the process of FIG. 4 is followed, while for existing connections, the process of FIG. 5 is followed. Returning to FIG. 5 at 520, a future timeout value is calculated based on a protocol type and packet state. For example, the packet state for the network connection that already exists is stored in the connection state table 310. That packet state represents the state of the network connection based on previously received packets. Using the previous state, the new packet, and the protocol type, a timeout value can be computed. In a typical case, the new timeout state is greater than the previously stored timeout value. However, in process block 530 a comparison is made between the calculated future timeout value and the current timeout value stored in the connection state table. In decision block 540, if the future timeout value is less than the current timeout value, then in process block 550 the timeout value is updated in both the linked list 320 and in the connection state table 310. Alternatively, in decision block 540, if the future timeout is not less than the current timeout then, in process block 560, the timeout value is only updated in the connection state table. Process block 560 is considered the more typical example of how network packets are processed. If process block 560 is used, the timeout value within the connection state table is different than the timeout value in the linked list of timer entries. Despite having different timers for the same entry, the system allows for a substantial time savings on processing the network packet, as a memory access to the linked list 320 is not needed on every packet. Consequently, the linked list of timer entries 320 has an intentionally outdated timeout value for this entry, while the connection state table 310 includes the primary or master timeout value, which is ultimately used to determine if a timeout occurred.

Figure 6:
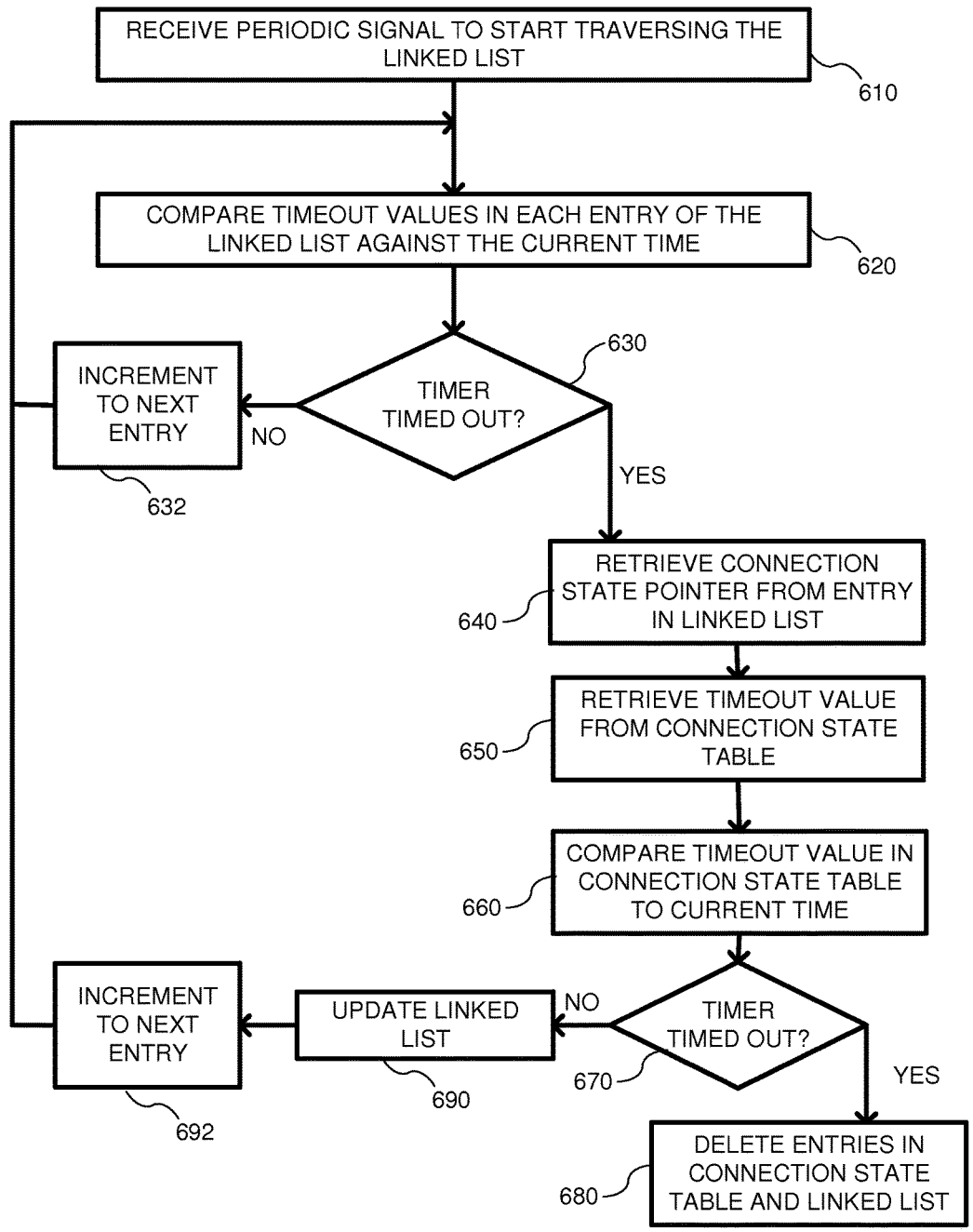
FIG. 6 shows a flowchart according to yet another embodiment wherein a linked list is traversed in order to determine whether a timeout occurred.

FIG. 6 is a flow chart of a method for traversing the linked list of timer entries 320. In process block 610, the periodic signal to start traversing the linked list is received from the hardware timer 360. In response, the time-out controller 350 uses FIFO 370 to obtain next timer entries from the linked list. In process block 620, the time-out controller 350 compares timeout values in each entry of the linked list against the current time. While different systems can be used, in the illustrated embodiment, real time values are used so that a comparison is between a current time/day/month/year time value and a time/day/month/year time value for the linked list entry. Other time values can be used, such as only time or only a counter value. However, in the present description, the time values are described as greater than or less than depending on whether the time is after or before in a comparison, respectively. In decision block 630, if the timeout value has not timed out (i.e., the current time is less than the time-out value), then the process returns to process block 620 after an entry pointer has been incremented (process block 632) and the next entry is retrieved from the FIFO 370. At that point, the hardware 370 can determine which timer entry to pull from the linked list using the next timer address 266 (FIG. 2). If the time-out controller 350 determined that a timeout occurred in decision block 630 (i.e., the current time is greater than the timeout value), then in process block 640, the corresponding entry from the connection state table is checked. Consequently, the time-out controller 350 uses the entry from the linked list to obtain the connection state entry address 270 corresponding to this network connection. Using that pointer, the time-out controller 350 can retrieve the timeout value 236 from the connection state table. In process block 660, a comparison can be made between the timeout value in the connections state table to the current time. In decision block 670, if the comparison indicates that the timeout value 236 has expired, then in process block 680 entries in the connection state table and linked list are deleted. Thus, if both the secondary timeout value in the linked list and the primary timeout value in the connection state table indicate that a timeout occurred, then the network connection is terminated. Otherwise, if the connection state table timeout value did not timeout, then in process block 690 the linked list is updated so that the timeout value within the connection state table and the timeout value in the linked list match. At this point, no actual timeout value has expired because the linked list entry was out of date. After process block 690, the time-out controller can continue the process flow by returning to process block 620 after incrementing the entry pointer to the next entry (process block 692).

Figure 7:
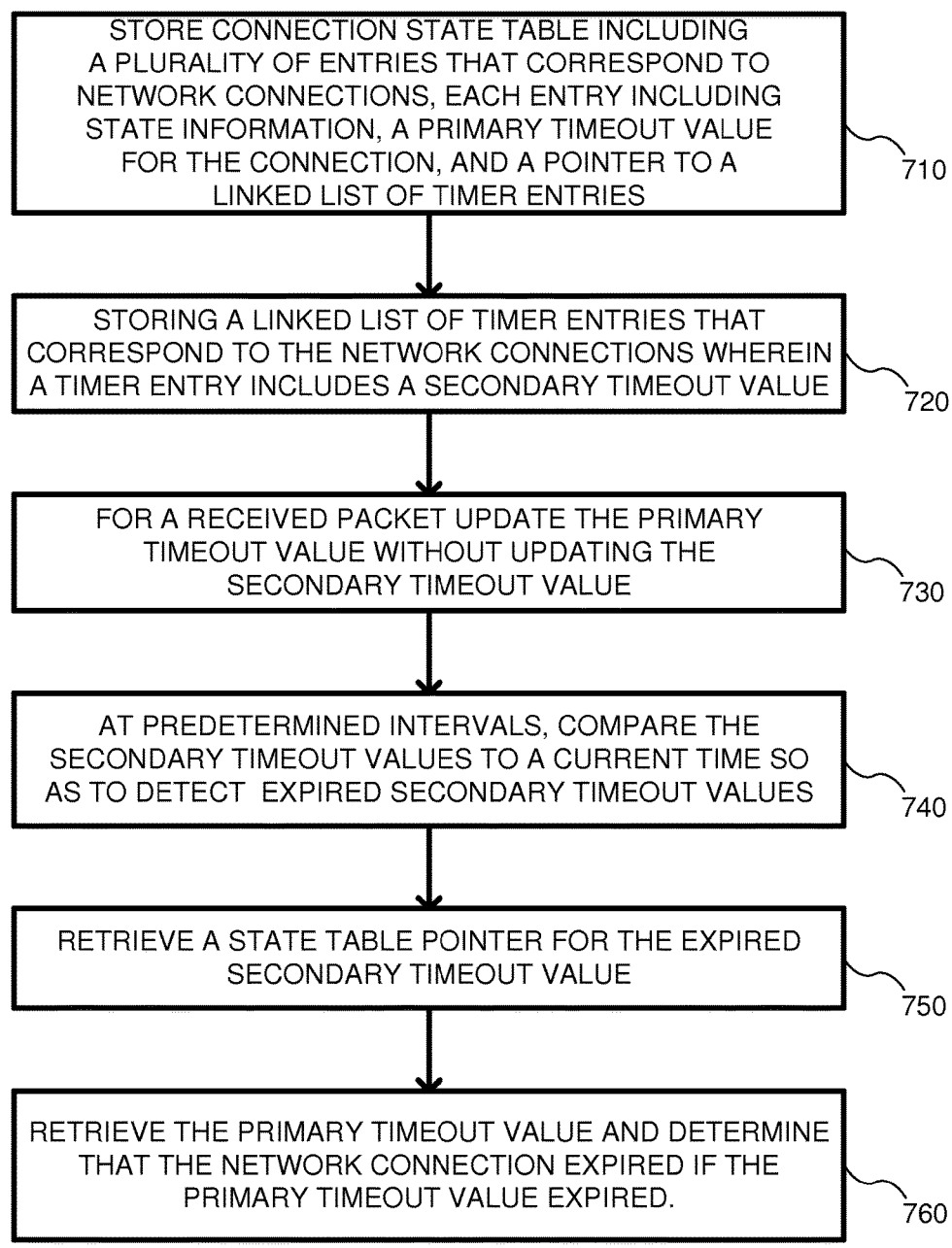
FIG. 7 is a flowchart according to one embodiment for tracking timeout values in packet transmissions.

FIG. 7 is a flow chart of an embodiment for tracking timeout values in packet transmissions. In process block 710, a connection state table is stored, such as in memory, and includes a plurality of entries that correspond to network connections. Each entry in the connection state table includes state information, a primary timeout value for the connection, and a pointer to a linked list of timer entries. An example of such a connection state table is shown in FIG. 2 at 210, and, as indicated by the connection state table entry 230, other fields can be included in each entry. In process block 720, a linked list of timer entries is also stored in a memory wherein the entries in the linked list correspond to the network connections. The entries in the linked list include a secondary timeout value for the network connection. Thus, the connection state table 310 and the linked list 320 include two timeout values for each network connection and those timeout values can be the same or the timeout value in the linked list can be out-of-date. In process block 730, for a received packet, the primary timeout value stored in the connection state table 310 is updated without updating the secondary timeout value. This is the more typical example as was described in process block 560 of FIG. 5. By not updating the linked list of timer entries, greater packet throughput is achieved. Specifically, the connection state table is accessed for every packet received, so updating a timer entry in the connection state table costs very little overhead. However, the linked list of timer entries need not be accessed every packet, which is a significant time saving in processing packets. At process block 740, at predetermined intervals, a comparison is made of the secondary timeout values to a current time so as to detect expired secondary timeout values. However, the secondary timeout values can be outdated. Therefore, a further check is needed to determine if a true timeout has occurred. Nonetheless, checking the timeout values of the linked list is more efficient than checking the much larger connection state table 310 because the linked list is typically much smaller than the connection state table, as described above. Additionally, the connection state table is updated upon receipt of every network packet, so storing the primary timeout value does not add unnecessary overhead. In process block 750, a state table pointer is retrieved for the expired secondary timeout value. An example state table pointer is the connection state entry address shown at 270. This state table pointer allows the time-out controller 350 to easily access the corresponding entry for that network connection in the connection state table 310. In process block 760, the primary timeout value is retrieved from the connection state table 310 and a determination is made whether the network connection has expired based on that timeout value. Thus, if both the secondary timeout value and the primary timeout value have both expired, then a true timeout has occurred and the network connection is terminated. Otherwise, the network connection is maintained open.

Figure 8:
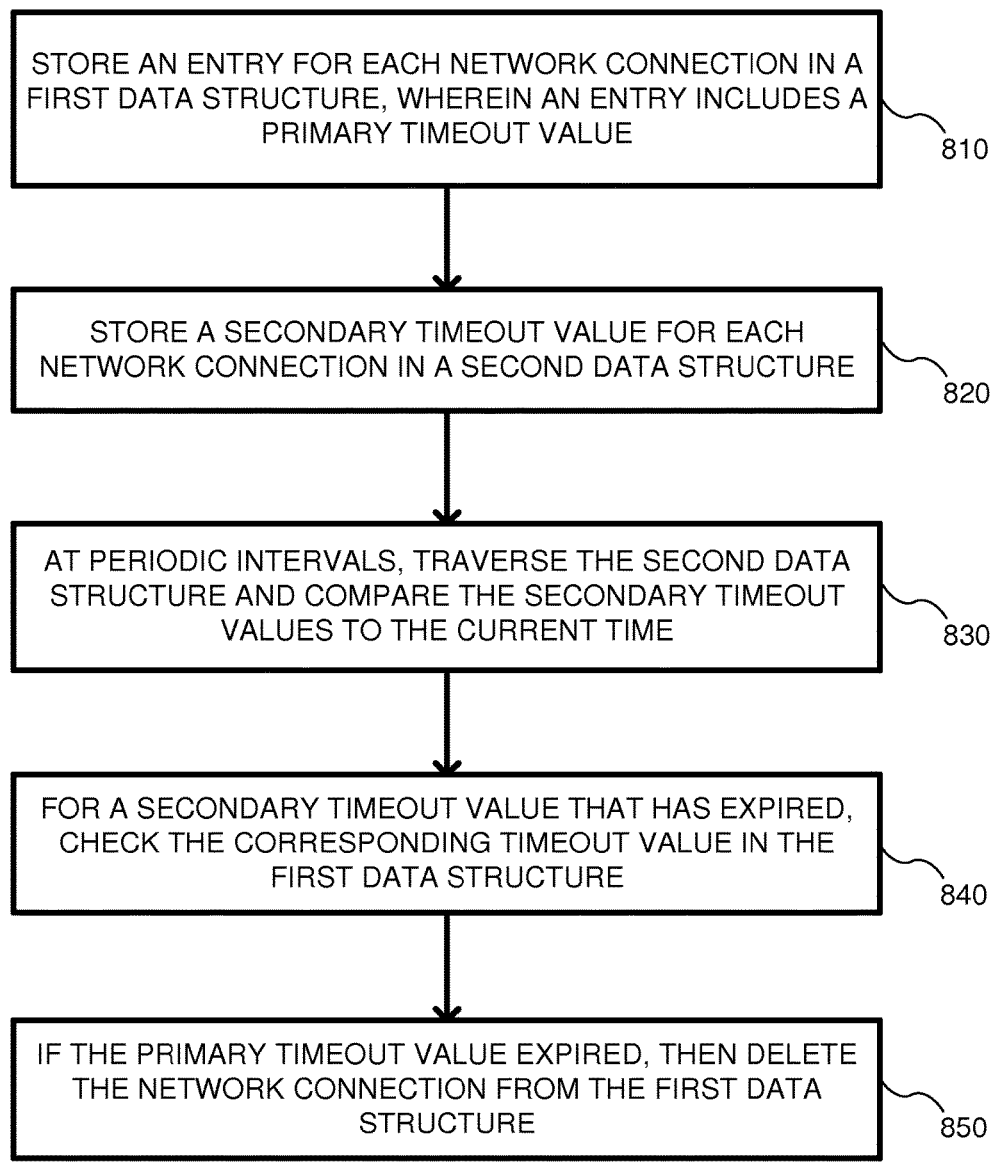
FIG. 8 is a flowchart according to another embodiment for tracking timeout values in packet transmissions.

FIG. 8 is a flowchart according to another embodiment for tracking timeout values in packet transmissions. In process block 810, an entry is stored for each network connection in a first data structure, such as a connection state table, wherein an entry includes a primary timeout value. Additional parameters can be stored with the primary timeout value, such as a cross reference to a second data structure, such as the linked list of timer entries. In process block 820, a secondary timeout value is stored for each network connection in the second data structure. This secondary timeout value is stored in a different memory area than the primary timeout value. As previously shown in FIG. 3, the connection state table 310 and the linked list 320 can be stored in a same memory 330 or in different memories. In process block 830, at periodic intervals the time-out controller 350 traverses the second data structure and compares the secondary timeout values to the current time. In process block 840, for a secondary timeout value that is expired, a corresponding timeout value in the first data structure is also checked. There are numerous ways to retrieve the timeout value in the first data structure. One technique is to use a pointer within the timer entry of the second data structure. An example pointer is shown at 270 in FIG. 2. Other techniques can be used for retrieving the timeout value from the first data structure. For example, the packet header information can be used to recalculate the unique identification of the network connection and that value can be used to access the first data structure. However, recalculating the unique identifier can be time consuming. Moreover, calculating the unique identifier would require storing too much information (i.e., the packet header fields) in the second data structure, which would dramatically increase the memory size of the second data structure. In the case where the first data structure is a connection state table, storing the connection state entry address 270 allows the time-out controller 350 to more efficiently access the connection state table. At process block 850, if the primary timeout value expired, then the network connection is considered to have timed out and is terminated. For example, the entry for that network connection in the connection state table 310 and in the linked list 320 is deleted. For example, to delete the entry within the linked list, the valid bit 262 can be cleared and the previous timer address 268 and the next timer address 266 can be adjusted so as to bypass the entry being deleted. The connection state table entry can also be cleared using a valid bit (not shown). Using the above flow, the connection state table is accessed with receipt of every packet and the linked list is accessed at periodic intervals based on a threshold period of time (e.g., 0.5 seconds). By limiting accesses to the linked list, overall packet throughput is increased. Specifically, as explained above, the connection state table is accessed anyway on every packet, so updating a timer in the connection state table does not add significant overhead. On the contrary, updating a timer in the linked list can cause significant overhead because the entry in the linked list needs to be retrieved and updated, an operation that would not otherwise occur.

Figure 9:
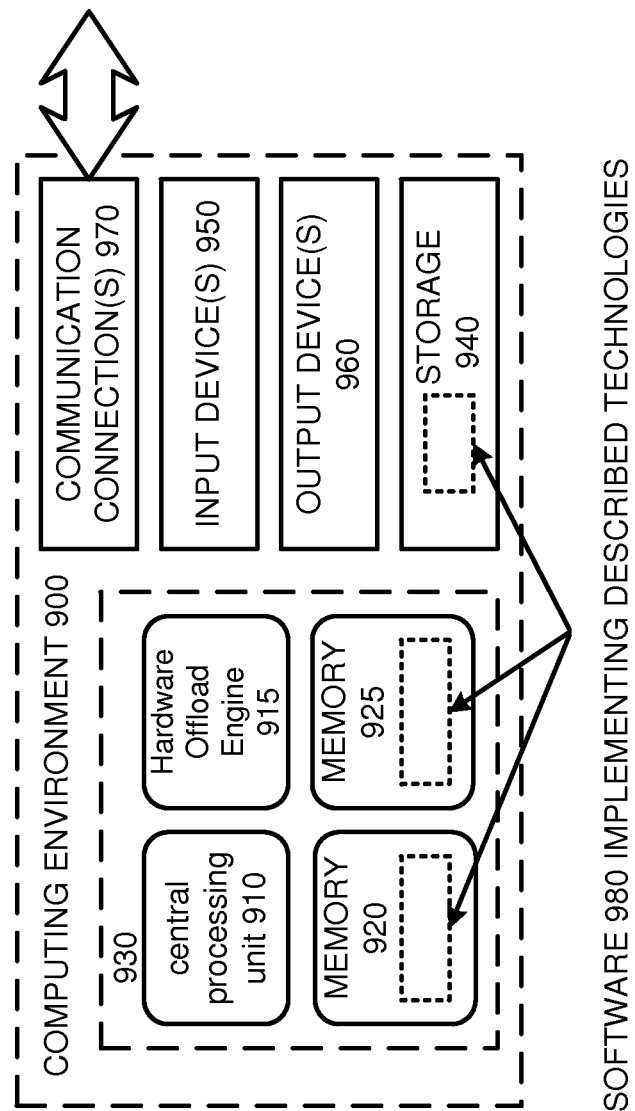
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, memory 920, 925, and a hardware offload engine 915. In FIG. 9, this basic configuration 930 is included within a dashed line. The processing units 910 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. The hardware offload engine 915 can include hardware logic shown (outside of memory 330) in FIG. 3. For example, the hardware offload engine 915 can include the time-out controller 350 and the hardware timer 360. Other hardware components (e.g., FIFO 370 and next available timer hardware 380) can be used. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 can include the memory components from the memory 330 (FIG. 3). The memory 920, 925 can also store software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of tracking timeout values in network connections, the method comprising:
    storing, in a memory, a connection state table including a plurality of entries corresponding to network connections, each entry including at least a state of a network connection, a primary timeout value for the network connection, and a timer-entry pointer to a corresponding entry in a linked list of timer entries;
    storing the linked list of timer entries, with the timer entries corresponding to the network connections, a timer entry including a secondary timeout value per network connection and a state table pointer to a corresponding entry in the connection state table, wherein the secondary timeout value per network connection within the linked list and the corresponding entry, which is the primary timeout value, in the connection state table are associated with a same network connection;
    for a received packet, identifying a corresponding entry in the connection state table, and updating the primary timeout value based on the received packet without updating the secondary timeout value in the linked list;
    at predetermined intervals, comparing the secondary timeout values in the linked list to a current time so as to detect expired secondary timeout values;
    for an expired secondary timeout value, retrieving the state table pointer for that timer entry;
    retrieving the primary timeout value using the retrieved state table pointer;
    determining that the network connection has expired if the primary timeout value has expired by comparing the primary timeout value to the current time; and
    terminating the network connection in response to the determination that the network connection has expired.

2. The method of claim 1, wherein the predetermined intervals are determined using a single hardware timer so that the single hardware timer can be used to track primary and secondary timeout values for all of the network connections.

3. The method of claim 1, further including providing a First-In-First-Out (FIFO) memory that stores indications of available timer entries in the linked list.

4. The method of claim 1, wherein updating the primary timeout value includes comparing a current primary timeout value to a candidate updated primary timeout value for the received packet, and determining that the candidate updated primary timeout value is later than the current primary timeout value.

5. The method of claim 1, wherein the linked list is a doubly linked list, and the method further comprises, if the primary timeout value has expired, removing an entry corresponding to the primary timeout value from the doubly linked list.

6. A method to track timeout values, the method comprising:
    storing a respective entry for each of a plurality of network connection in a first data structure, wherein each entry in the first data structure includes a respective state of the network connection and a respective primary timeout value;
    storing, in a memory, a respective secondary timeout value for each network connection in a second data structure;
    at periodic intervals, traversing the second data structure and comparing the secondary timeout values to a current time, wherein the secondary timeout values are subordinate to the primary timeout values and wherein each network connection has corresponding primary and secondary timeout values;
    for an expired secondary timeout value, determining whether the corresponding primary timeout value in the first data structure has expired; and
    if the corresponding primary timeout value has expired, then deleting the entry for the corresponding network connection from the first data structure and terminating the corresponding network connection.

7. The method of claim 6, wherein each entry in the first data structure includes a respective pointer to a corresponding entry in the second data structure and the second data structure includes entries with respective pointers to the corresponding entries in the first data structure.

8. The method of claim 6, further including:
    for a received packet, determining an entry in the first data structure for the received packet; and
    determining an updated timeout value for the determined entry, and, if the updated timeout value is later than the primary timeout value for the determined entry, replace the primary timeout value for the determined entry with the updated timeout value.

9. The method of claim 8, further including:
    if the updated timeout value is earlier than the primary timeout value for the determined entry, replacing the primary timeout value with the updated timeout value and replacing the secondary timeout value in the second data structure with the updated timeout value.

10. The method of claim 6, further including:
    receiving an input from a single hardware clock in order to determine the periodic intervals.

11. The method of claim 6, wherein the first data structure is accessed with a receipt of every packet, and the second data structure is traversed at the periodic intervals based on a threshold period of time.

12. The method of claim 6, further including:
    prefetching a plurality of secondary timeout values from the second data structure to be processed during the traversal.

13. The method of claim 6, further including:
receiving a packet for a new network connection; and
retrieving an indicator of an available timer entry in the second data structure.

14. The method of claim 6, wherein the second data structure is a doubly linked list and, wherein if the corresponding primary timeout value expired, removing the entry corresponding to the expired primary timeout value from the doubly linked list.

15. The method of claim 6, wherein traversing the second data structure includes using next entry addresses in entries of the second data structure and for each entry of the second data structure, retrieving the secondary timeout values and comparing the second timeout values to a current time.

16. A system for tracking timeout values in network connections, comprising:
a first memory storage area for storing a first data structure including respective entries for each network connection, wherein a given entry in the first memory storage area includes a respective primary timeout value for the corresponding network connection;
a second memory storage area for storing a second data structure of timer entries, each timer entry including a respective secondary timeout value for a given network connection, so that each network connection has corresponding entries in the first memory storage area and in the second memory storage area, each entry in the first memory storage area cross-references one of the entries in the second memory storage area, and each entry in the second memory storage area cross-references one of the entries in the first memory storage area;
a hardware timer; and
a processor coupled to the first and second memory storage areas and the hardware timer, the processor configured to periodically traverse the second data structure of timer entries in the second memory storage area to determine the secondary timeout values that have expired, and, for any expired secondary timeout values, use the stored cross-reference to an entry in the first memory storage area in order to determine if the corresponding primary timeout value has expired.

17. The system of claim 16, further including a First-In-First-Out (FIFO) memory coupled to the processor that stores indicators of available timer entries usable for new network connections.

18. The system of claim 16, further including a prefetch First-In-First-Out (FIFO) memory coupled to the second memory storage area for storing indicators of timer entries that the processor uses for periodically traversing the second data structure of timer entries.

19. The system of claim 16, wherein the first memory storage area and the second memory storage area are within a same memory.

20. The system of claim 16, wherein the entries in the first memory storage area further include state information for the corresponding network connection.

21. The system of claim 16, wherein the first data structure is a connection state table that is sized to a capacity of all potential network connections, whether the network connections are active or not and the second data structure is a linked list that is sized to a capacity of all active network connections.

22. The system of claim 16, wherein the system is an input/output (IO) device including one or more of the following: a network interface card and an offload engine.

* * * * *